(12) United States Patent
Velusamy et al.

(10) Patent No.: US 12,292,135 B2
(45) Date of Patent: May 6, 2025

(54) NON-CONTACT VISUAL INDICATION FOR MOTION SENSING

(71) Applicant: Dresser LLC, Houston, TX (US)

(72) Inventors: Manojkumar Velusamy, Coimbatore (IN); Jayaganesh Nataraj, Coimbatore (IN)

(73) Assignee: Dresser LLC, Houston, TX (US)

( * ) Notice: Subject to any disclaimer, the term of this patent is extended or adjusted under 35 U.S.C. 154(b) by 202 days.

(21) Appl. No.: 18/066,760

(22) Filed: Dec. 15, 2022

(65) Prior Publication Data

US 2024/0200687 A1    Jun. 20, 2024

(51) Int. Cl.
*F16K 37/00* (2006.01)

(52) U.S. Cl.
CPC .................... *F16K 37/0016* (2013.01)

(58) Field of Classification Search
CPC ... F16K 37/00; F16K 37/0008; F16K 37/0016
USPC ............................................. 324/200, 207.11
See application file for complete search history.

(56) References Cited

U.S. PATENT DOCUMENTS

| 4,259,801 A | * | 4/1981 | Ito | G09F 9/375 |
|---|---|---|---|---|
| | | | | 40/449 |
| 6,067,927 A | * | 5/2000 | Johnson | G01F 23/205 |
| | | | | 116/284 |
| 10,590,631 B2 | * | 3/2020 | Keighley | E02F 3/3663 |

FOREIGN PATENT DOCUMENTS

| CN | 206002969 U | * | 3/2017 | ............. | E05B 41/00 |
|---|---|---|---|---|---|
| SI | 21768 A | * | 10/2005 | ............. | G09F 9/375 |
| WO | WO-0062274 A1 | * | 10/2000 | ............. | G09F 9/375 |

* cited by examiner

*Primary Examiner* — Hoai-An D. Nguyen
(74) *Attorney, Agent, or Firm* — Mintz, Levin, Cohn, Ferris, Glovsky and Popeo, P.C.

(57) ABSTRACT

An indication system includes the following features. A mechanism is within an enclosure. An indicator is mounted to an outer surface of the enclosure. A magnet couples the indicator to a component of the mechanism indicative of a state of the mechanism. The indicator displays a reading indicative of the state of the mechanism responsive to the magnet coupling.

20 Claims, 4 Drawing Sheets

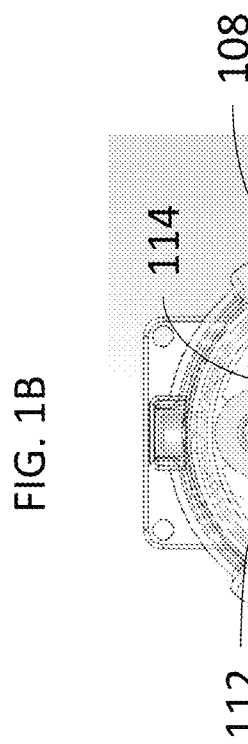
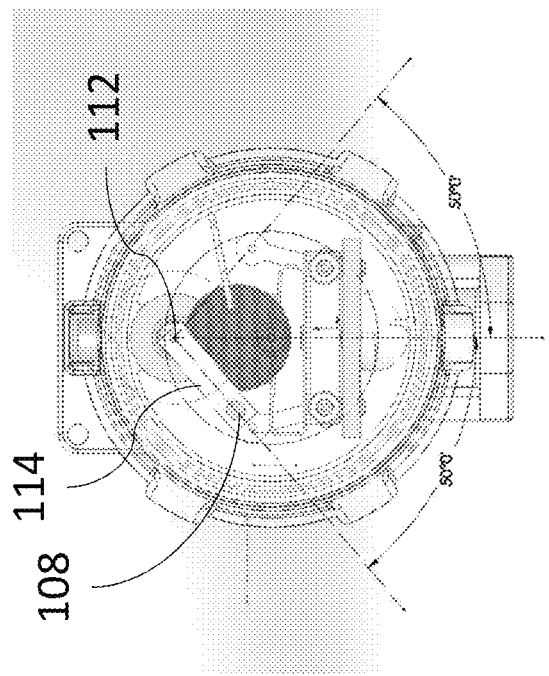

NON-CONTACT VISUAL INDICATION FOR MOTION SENSING

TECHNICAL FIELD

This disclosure relates to technologies for visual indication for a state of mechanical components.

BACKGROUND

Control valves are used for a variety of functions in plant or pipeline operations. Such valves are used to direct, isolate, and/or throttle fluid through various conduits within the plant or pipeline. Control valves can be manual, actuated, or both. Actuated valves can be actuated at the control valve itself or remotely, for example, from a control room or a data van. Some control valves also include position feedback mechanisms. Such position feedback can provide a visual indication or a signal indicative of position that can be interpreted by the remote site.

SUMMARY

Non-contact visual indication for motion sensing is provided.

In one embodiment, a device to be mounted to an outer surface of an enclosure is provided. In some embodiments the device includes a lever arranged to magnetically couple with a mechanism within the enclosure. An indicator can be mechanically coupled to the lever. The indicator can show a color responsive to a position of the lever.

In some embodiments, the indicator can include a binary indicator or a graduated indicator. In some embodiments, the indicator can include one or more flaps. Each flap can include two sides: a first side of each flap being a first color, and a second side of each flap being a second color.

In another embodiment, an indication system is provided and can include a mechanism within an enclosure. An indicator can be mounted to an outer surface of the enclosure. A magnet can couple the indicator to a component of the mechanism indicative of a state of the mechanism. The indicator can display a reading indicative of the state of the mechanism responsive to the magnet coupling.

In some aspects, the magnet can be within the enclosure or within the indicator. The indicator can include a binary indicator or a graduated indicator. In some embodiments the indicator can include one or more flaps.

In some embodiments, the enclosure can be an explosion proof enclosure. A variety of mechanisms can be housed within the enclosure. For example the mechanism can include an electromechanical switch or a position feedback sensor.

In another implementation, a method is provided and can include attaching an indicator to an outside of an enclosure containing a mechanism such that a magnet magnetically couples the indicator with a component of the mechanism such that the indicator displays a reading indicative of a state of the mechanism in response to the magnetic coupling.

In some embodiments, the mechanism can be received within the enclosure prior to attaching an indicator to an outside of the enclosure. The enclosure can then be opened, and the magnet can be attached to the component of the mechanism. The component can be indicative of a mechanism state. The enclosure can then be closed. In some embodiments, the mechanism can include a proximity switch. In some embodiments, the enclosure can be an explosion proof enclosure.

In some embodiments, the indicator can include a binary indicator and/or a graduated indicator. The indicator can include one or more flaps.

BRIEF DESCRIPTION OF THE FIGURES

These and other features will be more readily understood from the following detailed description taken in conjunction with the accompanying drawings, in which:

FIG. 1B and FIG. 1C are front views of the example mechanism in a first position and a second position respectively;

The details of one or more embodiments of the subject matter described within this disclosure are set forth in the accompanying drawings and the description below. Other features, aspects, and advantages of the subject matter will become apparent from the description, drawings, and the claims.

DETAILED DESCRIPTION

Certain embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting embodiments and features illustrated or described in connection with one embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Sizes and shapes of the systems and devices, and the components thereof, can depend at least on the anatomy of the subject in which the systems and devices will be used, the size and shape of components with which the systems and devices will be used, and the methods and procedures in which the systems and devices will be used.

This disclosure relates to a visual position indicator that can be attached and/or retrofitted to existing valves. Such an indicator can be added to existing valves without compromising enclosure ratings containing valve mechanisms. That is, new penetrations do not need to be added to existing valve enclosures. Visual indications of valve positions can act as a fail-safe in the event that a valve feedback sensor has failed. Alternatively or in addition, such visual indications may be the only feedback indication for some valves, for example, maintenance isolation valves. The visual indicator described herein can be added to existing valves that may not include such visual indication, improving safety for on-site personnel. Alternatively or in addition, the visual indicators described herein can be added to enclosures with faulty visual indicators without needing to send in the enclosure for service.

Figure 1A:
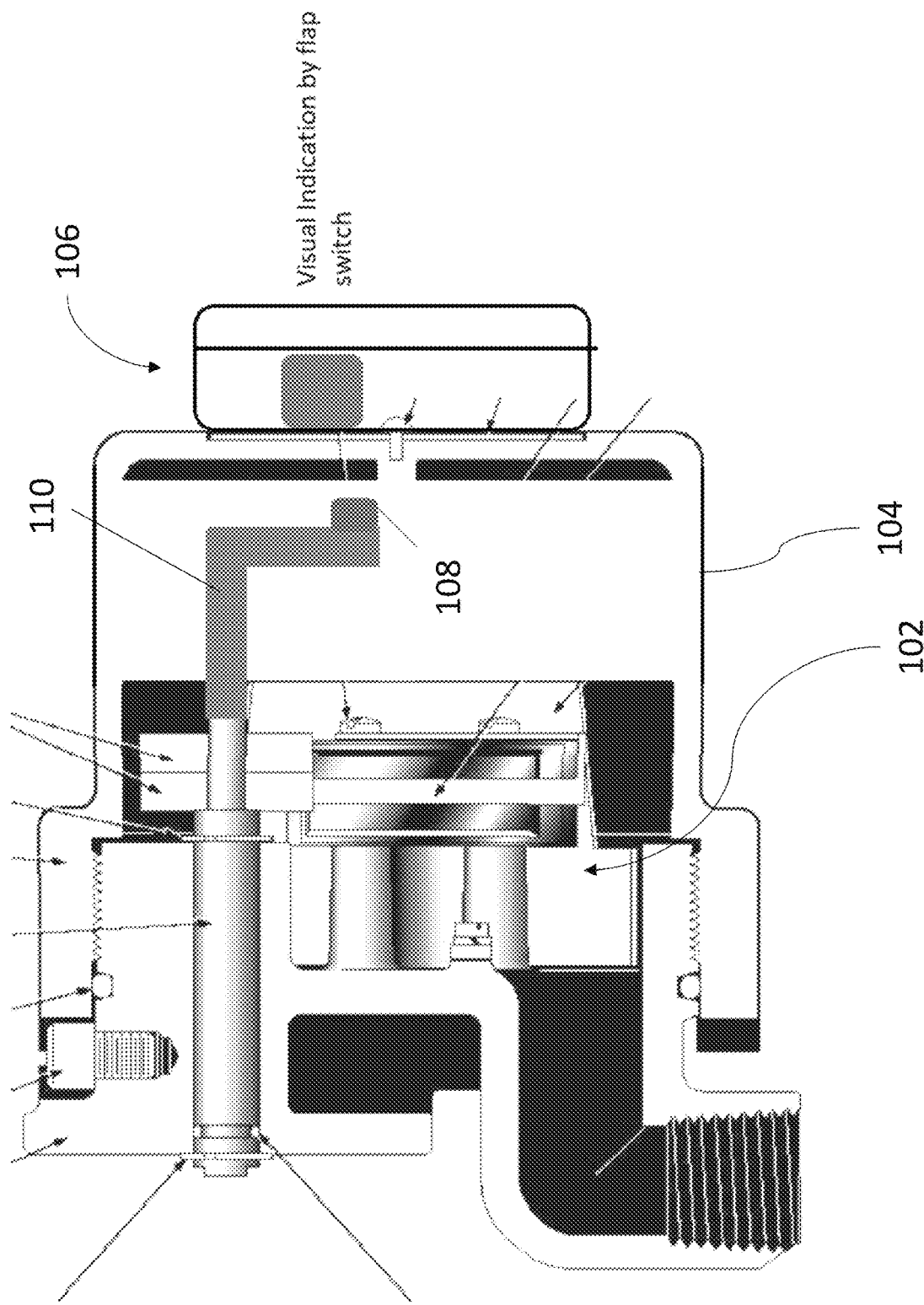
FIG. 1A is a side cross-sectional view of an example mechanism in an explosion proof enclosure with an indicator attached on an outer surface of the enclosure.

As illustrated in FIG. 1A, a mechanism 102 is housed within an explosion proof enclosure 104, for example, within a hydrocarbon processing facility. While primarily described within the context of this disclosure as an explosion proof enclosure, the enclosure can be any form of enclosure that cannot be easily opened within the field, for example, a class I, division I or division II enclosure. Such enclosures are used where a hazardous atmosphere may be present. Explosion proof enclosures (as well as class I enclosures) do not have openings for easy ingress or egress. Such sealing reduces the likelihood of a hazardous or combustible atmosphere entering the enclosure (class I) or reduces the risk that any ignition of a combustible atmosphere by containing such an ignited atmosphere within the enclosure (explosion proof).

Such requirements make it difficult to allow for a shaft or other mechanical device to extend out from the enclosure 104, particularly in brown-field installations where many enclosures may already be installed in a hazardous environment. As such, an indicator 106 that is attached or otherwise mounted on an outer surface of the enclosure 104 requires a way to couple with the mechanism 102 within the enclosure 104 without penetrating the enclosure 104. To solve this problem, in one embodiment, a magnet 108 can couple the indicator 106 to a component 110 of the mechanism 102 indicative of a state of the mechanism 102. In the context of this disclosure, the mechanism 102 includes mechanical components that move relative to a state of a mechanical device, for example, a valve actuator that moves relative to a valve position. Alternatively or in addition, the mechanism 102 can include mechanical components that move relative to the state of an electrical device, for example, a solenoid. Non-limiting examples of such mechanisms are described throughout this disclosure. In some implementations, the magnet 108 is within the enclosure 104 and is directly attached to the component, for example, a lever 114 coupled to a positioning shaft 112 as shown in FIG. 1B, where the position shaft 112 and the lever 114 are in first position, and FIG. 1C, where the position shaft 112 and the lever 114 in a second position. In such embodiments, the indicator includes a component, such as a lever, that is made of a magnetic material, such as steel, that allows for magnetic coupling. In some implementations, the magnet 108 is located within the indicator 106. In such embodiments, the mechanism includes a component, such as a lever, that is made of a magnetic material, such as steel, that allows for magnetic coupling. Alternatively or in addition, both the mechanism 102 and the indicator can include magnets arranged to magnetically couple with one another across a shell of the enclosure 104. All of the arrangement described herein allow for a separate, standalone indicator to be installed on an existing enclosure 104 without compromising an integrity of the enclosure 104.

The indicator 106 itself, once installed onto the enclosure, is configured to display a state of the mechanism 102 within the enclosure 104. For example, in some embodiments, the indicator 106 can show or display a first color when the mechanism is in a first state, and display or show a second color when the mechanism 102 is in a second state. Regardless of what is displayed by the indicator, the reading displayed by the indicator is displayed responsive to the magnet coupling.

Figure 2A:
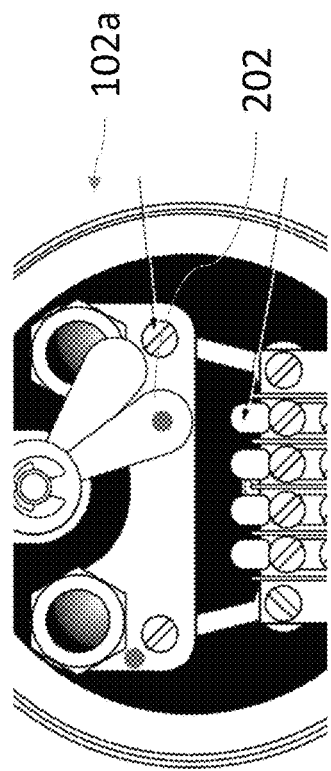
FIGS. 2A-2C are example mechanisms that can be used with aspects of this disclosure.
Figure 2B:
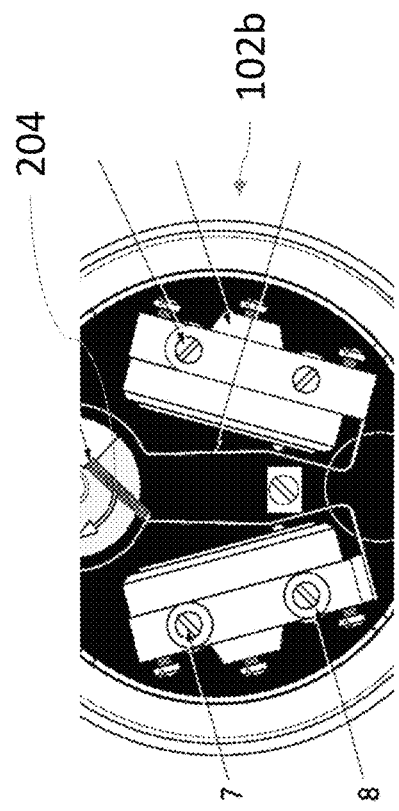
Figure 2C:
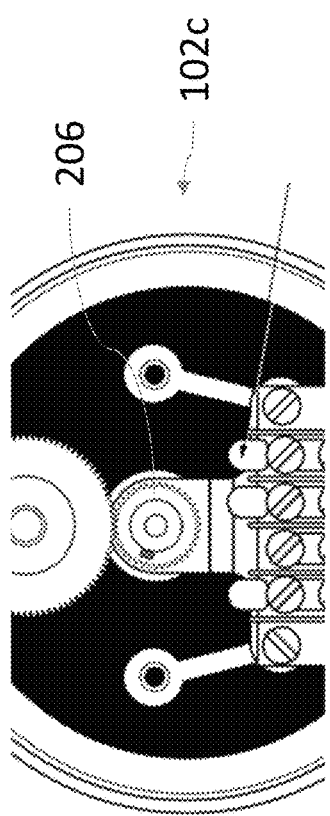

FIGS. 2A-2C are example mechanisms that can be used with aspects of this disclosure. For example, in some embodiments, the mechanism can include an electromechanical switch 102a. In such an embodiment, the magnet 108 can be positioned on the movable contact 202. Alternatively or in addition, the magnet 108 can be included within the indicator. In such an embodiment the magnet couples to the movable contact through the enclosure 104.

In some implementations, the mechanism can include a proximity switch 102b. In such an embodiment, the magnet 108 can be positioned on a component of the mechanism indicative of position, for example, a lever 204. Alternatively or in addition, the magnet 108 can be included within the indicator. In such an embodiment the magnet couples to the movable contact through the enclosure 104.

In some embodiments, the mechanism can include a position feedback sensor 102c. In such an embodiment, the magnet 108 can be positioned on a component of the mechanism indicative of position, for example, a gear 206. Alternatively or in addition, the magnet 108 can be included within the indicator. In such an embodiment the magnet couples to the movable contact through the enclosure 104.

Figure 3A:
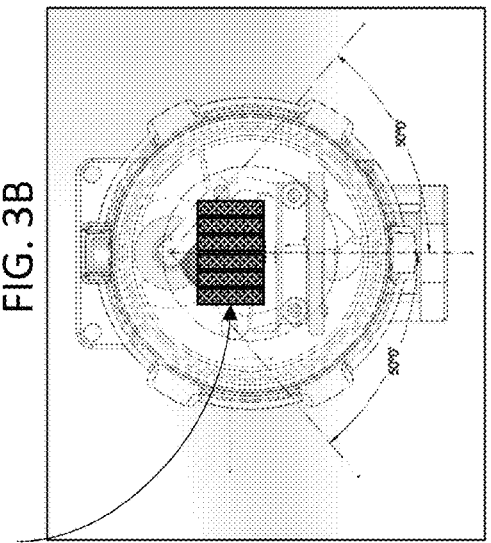
FIGS. 3A, 3B and 3C are example indicator displays that can be used with aspects of this disclosure.
Figure 3B:
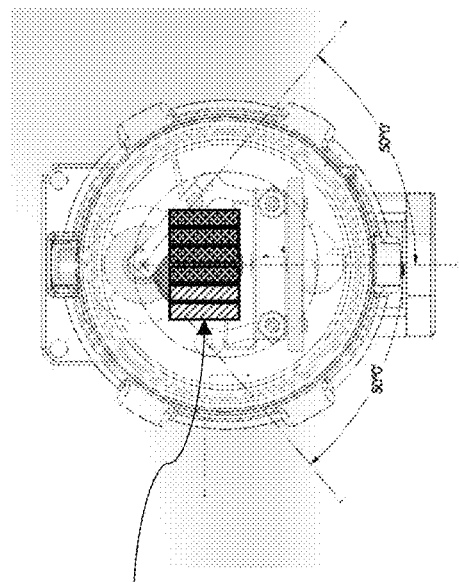
Figure 3C:
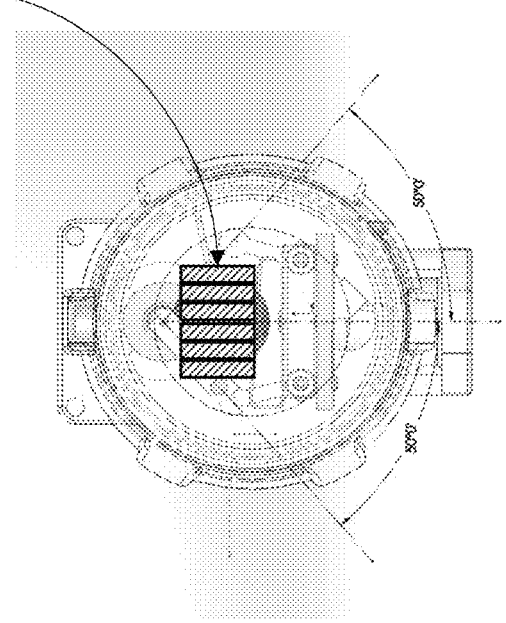

FIGS. 3A, 3B and 3C are example indicator displays that can be used with aspects of this disclosure. In some embodiments, the indicator displays a binary state, for example, open or shut, on or off, etc. In some embodiments, the indicator displays a graduated state of the mechanism, for example, a percentage open or closed of a valve, or a distance from a proximity sensor (illustrated in FIG. 3C).

In some embodiments, the indicator can include one or more flaps 302. Each flap includes two sides: a first side being a first color and a second side being a second color. Alternatively or in addition, the indicator can include a colored wheel having multiple sectors each indicating a different state.

In assembly, the indicator 106 is attached to an outside of an enclosure 104 containing the mechanism 102 such that the magnet 108 magnetically couples the indicator with a component 110 of the mechanism 102 such that the indicator 106 displays a reading indicative of a state of the mechanism 102 in response to the magnetic coupling. In some embodiments, the enclosure 104 and mechanism 102 are pre-assembled, in a safe location, such that it is able to couple to the indicator 106. In one example, the mechanism 102, being within the enclosure 104, is received. The enclosure 104 is then opened. The magnet 108 is then attached to the component of the mechanism 102. As a reminder, the component 110 is indicative of a mechanism state. The enclosure 104 is then closed or otherwise sealed with the mechanism 102 and magnet 108 inside.

While this disclosure contains many specific embodiment details, these should not be construed as limitations on the scope of what may be claimed, but rather as descriptions of features specific to particular embodiments. Certain features that are described in this disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments, and it should be understood that the described components and systems can generally be integrated together in a single product or packaged into multiple products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A device to be mounted to an outer surface of an enclosure, the device comprising:
    a lever arranged to magnetically couple with a mechanism within the enclosure, the magnetic coupling extending between the lever and the mechanism across a shell of the enclosure such that the shell of the enclosure is between the lever and the mechanism to seal the mechanism from an outside environment and the lever; and
    an indicator mechanically coupled to the lever, the indicator showing a color responsive to a position of the lever.

2. The device of claim 1, wherein the indicator comprises a binary indicator.

3. The device of claim 1, wherein the indicator comprises a graduated indicator.

4. The device of claim 1, wherein the indicator comprises one or more flaps, each flap comprising two sides, a first side of each flap being a first color, a second side of each flap being a second color.

5. An indication system comprising:
    an enclosure;
    a lever arranged to magnetically couple with a mechanism within the enclosure;
    an indicator mounted to an outer surface of the enclosure; and
    a magnet coupling the indicator to a component of the mechanism indicative of a state of the mechanism, the magnet forming a magnetic coupling extending between the indicator and the component across a shell of the enclosure such that the shell of the enclosure is between the lever and the mechanism to seal the mechanism from an outside environment and the lever, the indicator displaying a reading indicative of the state of the mechanism responsive to the magnetic coupling.

6. The indication system of claim 5, wherein the magnet is within the enclosure.

7. The indication system of claim 5, wherein the magnet is within the indicator.

8. The indication system of claim 5, wherein the enclosure is an explosion proof enclosure.

9. The indication system of claim 5, wherein the mechanism is an electromechanical switch.

10. The indication system of claim 5, wherein the mechanism is a position feedback sensor.

11. The indication system of claim 5, wherein the indicator comprises a binary indicator.

12. The indication system of claim 5, wherein the indicator comprises a graduated indicator.

13. The indication system of claim 5, wherein the indicator comprises one or more flaps.

14. A method comprising:
    attaching an indicator to an outside of an enclosure containing a lever arranged to magnetically couple with a mechanism such that a magnet magnetically couples the indicator with a component of the mechanism such that the indicator displays a reading indicative of a state of the mechanism in response to the magnetic coupling, wherein the magnetic coupling extends between the indicator and the component across a shell of the enclosure such that the shell of the enclosure is between the lever and the mechanism to seal the mechanism from an outside environment and the lever.

15. The method of claim 14, further comprising:
    receiving the mechanism within the enclosure;
    opening the enclosure;
    attaching the magnet to the component of the mechanism, the component being indicative of a mechanism state; and
    closing the enclosure.

16. The method of claim 14, wherein the mechanism is a proximity switch.

17. The method of claim 14, wherein the enclosure is an explosion proof enclosure.

18. The method of claim 14, wherein the indicator comprises a binary indicator.

19. The method of claim 14, wherein the indicator comprises a graduated indicator.

20. The method of claim 14, wherein the indicator comprises one or more flaps.

* * * * *